US009118159B2

(12) United States Patent
Lera Martellanes et al.

(10) Patent No.: US 9,118,159 B2
(45) Date of Patent: Aug. 25, 2015

(54) OPTICAL PULSE GENERATOR

(71) Applicants:Proton Laser Applications, S.L., Salamanca (ES); Centro de Láseres Pulsados Ultracortos Ultraintensos, Salamanca (ES); Consejo Superior de Investigaciones Cientificas, Madrid (ES); Universitat Politècnica de València, Valencia (ES)

(72) Inventors: Roberto Lera Martellanes, Zamora (ES); Francisco Valle Brozas, Salamanca (ES); Luis Roso Franco, Salamanca (ES); José Maria Benlloch Baviera, Valencia (ES)

(73) Assignees: Proton Laser Applications, S.L., Salamanca (ES); Centro de Láseres Pulsados Ultracortos Ultraintensos, Salamanca (ES); Consejo Superior de Investigaciones Cientificas, Madrid (ES); Universitat Politècnica de València, Valencia (ES)

( * ) Notice: Subject to any disclaimer, the term of this patent is extended or adjusted under 35 U.S.C. 154(b) by 0 days.

(21) Appl. No.: 14/243,096

(22) Filed: Apr. 2, 2014

(65) Prior Publication Data

US 2014/0300949 A1      Oct. 9, 2014

(30) Foreign Application Priority Data

Apr. 5, 2013  (EP) .................................. 13162434

(51) Int. Cl.
  *H01S 3/00*  (2006.01)
  *H01S 3/23*  (2006.01)
(52) U.S. Cl.
  CPC ............. *H01S 3/0057* (2013.01); *H01S 3/2308* (2013.01)
(58) Field of Classification Search
  CPC ............................. H01S 3/0057; H01S 3/2308

USPC ......................................... 359/238, 333, 337
See application file for complete search history.

(56) References Cited

U.S. PATENT DOCUMENTS 3,549,239 A     12/1970  Brienza et al.
7,903,705 B2 *   3/2011  Apolonski et al. .............. 372/30
(Continued)

FOREIGN PATENT DOCUMENTS

JP        47-42346        10/1972
JP        11-298076       10/1999
(Continued)

OTHER PUBLICATIONS

Search Report for EP 13 16 2434, dated Aug. 12, 2013.
(Continued)

*Primary Examiner* — Mark Hellner
(74) *Attorney, Agent, or Firm* — Marshall, Gerstein & Borun LLP

(57) ABSTRACT

An optical pulse generator and a method for using the same, where the optical pulse generator includes a source to deliver a chirped pulse and a chirped pulse compressor, and a first manipulation device and a second manipulation device capable of wavelength dependent manipulating the propagation direction of the chirped pulse and a focusing device having a predetermined focus point. The second manipulation device is arranged after the first manipulation device in propagation direction of the chirped pulse and the first and the second manipulation device are capable of manipulating the propagation direction of the chirped pulse such that the chirped pulse is transformed, after passing the second manipulation device, into a pulse, wherein different chromatic parts of the pulse are spatially spread and temporarily fully aligned.

14 Claims, 7 Drawing Sheets

(56) References Cited

U.S. PATENT DOCUMENTS

| | | | |
|---|---|---|---|
| 8,669,488 B2* | 3/2014 | Squier et al. | 219/121.68 |
| 2003/0189756 A1* | 10/2003 | Erbert et al. | 359/572 |
| 2003/0218795 A1* | 11/2003 | Barty | 359/333 |

FOREIGN PATENT DOCUMENTS

| | | |
|---|---|---|
| JP | 11-347758 | 12/1999 |
| JP | 2007-067123 | 3/2007 |

OTHER PUBLICATIONS

He F et al., "Fabrication of microfluidic channels with a circular cross section using spatiotemporally focused femtosecond laser pulses", Optics Letters, OSA, Optical Society of America, Washington, DC, US, vol. 35, No. 7, Apr. 1, 2010, pp. 1106-1108, XP001553022, ISSN: 0146-9592.

Dawn N. Vitek et al.: "Temporally focused femtosecond laser pulses for low numerical aperture micromachining through optically transparent materials", Optics Express, vol. 18, No. 17, Aug. 6, 2010, XP055057478, Retrieved from the Internet: URL:http://www.opticsinfobase.org/DirectPDFAccess/AEF3F22E-9FBF-AOEF-B05870B28EC7A419__204940/oe-18-17-18086.pdf?da=1&id=204940&seq=0&mobile=no [retrieved on Mar. 22, 2013], p. 18086-p. 18089.

Office Communication, Japanese patent application No. P2014-077286, dated Mar. 10, 2015.

* cited by examiner

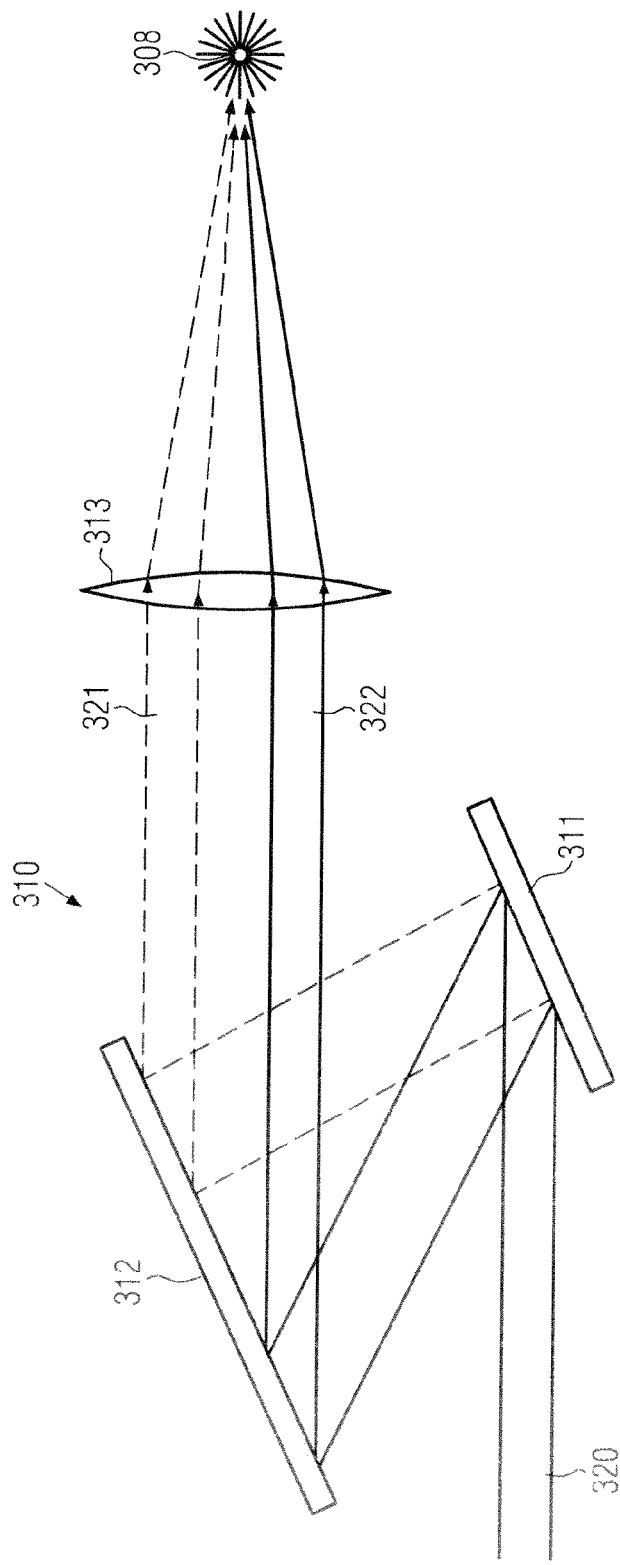

OPTICAL PULSE GENERATOR

CROSS-REFERENCE TO RELATED APPLICATION

The application claims priority of European Application No. 13162434.8, filed Apr. 5, 2013. The priority application, EP 13162434.8 is hereby incorporated by reference.

FIELD OF THE DISCLOSURE

The disclosure is related to an optical pulse generator capable of generating and focusing a chirped pulse and a corresponding method for generating and focusing such a chirped pulse.

BACKGROUND

Generating and focusing chirped pulses is a commonly known application of lasers. Typically, a chirped pulse passes a stretcher, an amplifier and four gratings that allow for compressing the chirped pulse in the time domain such that a pulse having a duration that is short compared to the original chirped pulse is obtained. The compressed pulse has spatial and temporal alignment of its different chromatic parts after leaving the gratings. After the process of first stretching then amplifying and then afterwards compressing the pulse, its diameter may be to large such that, although each of its chromatic parts are temporarily and spatially aligned, further focusing is necessary in order to achieve high energy densities on the target. The technology of stretching, amplifying and compressing a femtosecond pulse is known as "chirped pulse amplification" (CPA).

SUMMARY OF THE DISCLOSURE

The present disclosure is concerned with providing an optical pulse generator that allows for generating a chirped pulse and focusing it on a specific target wherein the apparatus should have a simplified design being less failure prone and allowing for sufficient temporal and spatial alignment of the resulting parts.

The presently disclosed optical pulse generator comprises a source to deliver a chirped pulse and a compressor for the chirped pulse which comprises a first manipulation device and a second manipulation device capable of wavelength dependent manipulating the propagation direction of the chirped pulse and a focusing device having a predetermined focus point and is characterized in that the second manipulation device is arranged after the first manipulation device in propagation direction of the chirped pulse and the first and second manipulation device are capable of manipulating the propagation direction of the chirped pulse such that the chirped pulse is transformed after passing the second manipulation device into a pulse wherein different chromatic parts of the pulse are spatially spread and temporarily fully aligned. In this context, temporarily fully aligned means that a possibly required refocusing of the spatially spread chromatic parts can be achieved by using non-chromatic devices such as mirrors or in good approximation lenses wherein the different chromatic parts, preferably all chromatic parts reach the focus point at the same time. By providing the first and the second manipulation device that can generate from the chirped pulse, a pulse comprising different chromatic parts being spatially spread and temporarily fully aligned, further devices that have influence on the propagation direction of the chirped pulse, wherein this influence is wavelength dependent, can be avoided.

In case the different chromatic parts that are spatially spread and temporarily fully aligned propagate parallel to each other, the different chromatic parts propagate in the time domain on a plane that is perpendicular to the propagation direction.

In case the different chromatic parts that are spatially spread and temporarily fully aligned propagate in the space domain in a converging or diverging manner, then they propagate on a sphere the centre of which is the point of convergence or the origin of the divergent propagation directions. Thereby focusing of the spatially spread parts that are temporarily fully aligned is possible by achromatic optical focussing components (e.g. lenses, or concave mirrors), wherein the different chromatic parts reach the focus point at the same time. They preferably interfere constructively yielding high power in a very short time (e.g. less than 50 fs).

In one embodiment, the optical pulse generator comprises two (identical) gratings (as the first and second manipulation device) and a curved mirror (and/or a lens) wherein the mirror and/or the lens is arranged after the gratings in propagation direction of the chirped pulse. By providing gratings that are identical (which means for example that the line spacing of the grating is identical), the optical pulse generator can be fabricated with minimum effort with respect to the number of required optical systems.

In one further embodiment, the optical pulse generator includes two different gratings (as first and second manipulation devices) and a focussing lens (and/or a focussing mirror) where the lens is arranged before the gratings in propagation direction of the chirped pulse. By providing such an arrangement, the propagating pulse from the second manipulation device e.g. the second grating, only requires minor focusing if any at all. Alternatively this can be achieved by using two gratings that are non-parallel.

In another embodiment, in the optical pulse generator the first and the second manipulation device comprise prisms. By providing prisms one can achieve further runtime differences of different chromatic parts, thereby achieving the temporal alignment.

In another embodiment, the optical pulse generator comprises a grating and a prism being the first or the second manipulation device. This arrangement allows for combining the advantageous of the gratings and the prisms.

In a further embodiment the focusing device comprises at least a mirror or a lens. Providing such achromatic focusing devices allows for avoiding unintended runtime differences of the different chromatic parts, thereby maintaining the achieved temporal alignment.

In one further embodiment, the optical pulse generator is capable of focusing the different chromatic parts of the chirped pulse on a predetermined line (e.g. with a cylindrical lens or mirror) wherein the line is essentially perpendicular to an averaged propagation direction of the different chromatic parts. Therefore, spatial and temporarily aligned parts can be generated on a line allowing for manifold applications.

In a further embodiment the optical pulse generator is characterized in that the source comprises a laser oscillator, a pulse stretcher and an amplifying stage which delivers the chirped pulse. By using such known devices the construction of the optical pulse generator can make recourse to already known devices.

By using such an optical pulse generator, a method for generating a pulse can be realized in that a chirped pulse passes the first manipulation device before passing the second manipulation device and the propagation direction of the chirped pulse is manipulated by the first and second manipulation device such that the chirped pulse is transformed after passing the second manipulation device into a pulse, and where different chromatic parts of the pulse are spatially spread and temporarily fully aligned. Thus, the generated pulse can be used in many ways since it provides high energy density and a preferably perfect peak structure of the pulse without preceding peaks and/or unintended dispersion.

In one embodiment, the compressed and focussed pulse has in the focus a duration of less than 1 ns, preferably less than 1 ps, more preferably less than 50 fs. Such short pulses allow for high energy deposition in a short timeframe when generated and focused with the above method and therefore provide the ability to manipulate the matter structure.

In a further embodiment, the method provides that the chirped pulse passes in propagation direction two identical manipulating devices (e.g. gratings) and a (focussing) mirror. Using two identical gratings makes it possible to apply the method flexibly since when using other frequencies for the chirped pulse is intended, replacing the gratings with two other identical gratings can allow for adapting the device and the method with respect to the new wavelength in a simple way.

In another embodiment, the method is includes the chirped pulse passes in propagation direction to a lens or a focussing mirror and two different manipulation devices (e.g. gratings). By passing the lens before passing the first and second manipulating device e.g. in the form of gratings, at least pre-focusing of the chirped pulse takes place which can therefore make further focusing devices pointless.

In another embodiment of this method, the chirped pulse passes, in propagation direction, two prisms. Thereby, temporal alignment is achieved at least in parts due to the different runtime different chromatic parts need to propagate through the prisms.

In another embodiment, the method provides the chirped pulse passes a prism and a grating. Hence, the optical properties of a grating and a prism can be used to achieve the temporal alignment.

In a further embodiment, the method includes the different chromatic parts are focused on a predetermined line, the predetermined line being essentially perpendicular to an average propagation direction of the different chromatic parts. Providing the pulse on a predetermined line allows for spatially extended energy deposition therefore allowing manifold applications.

In an alternative embodiment, the second grating is replaced by a plane mirror in such a way that the virtual image of the first grating given by the mirror coincides, preferably exactly coincides with the position of the second grating. This can also be achieved by using a prism and a mirror likewise.

BRIEF DESCRIPTION OF THE FIGURES

FIG. 3a-d realizations of the chirped parts compressor in accordance with preferred embodiments of the disclosure.

DETAILED DESCRIPTION OF THE DISCLOSURE

Figure 1:
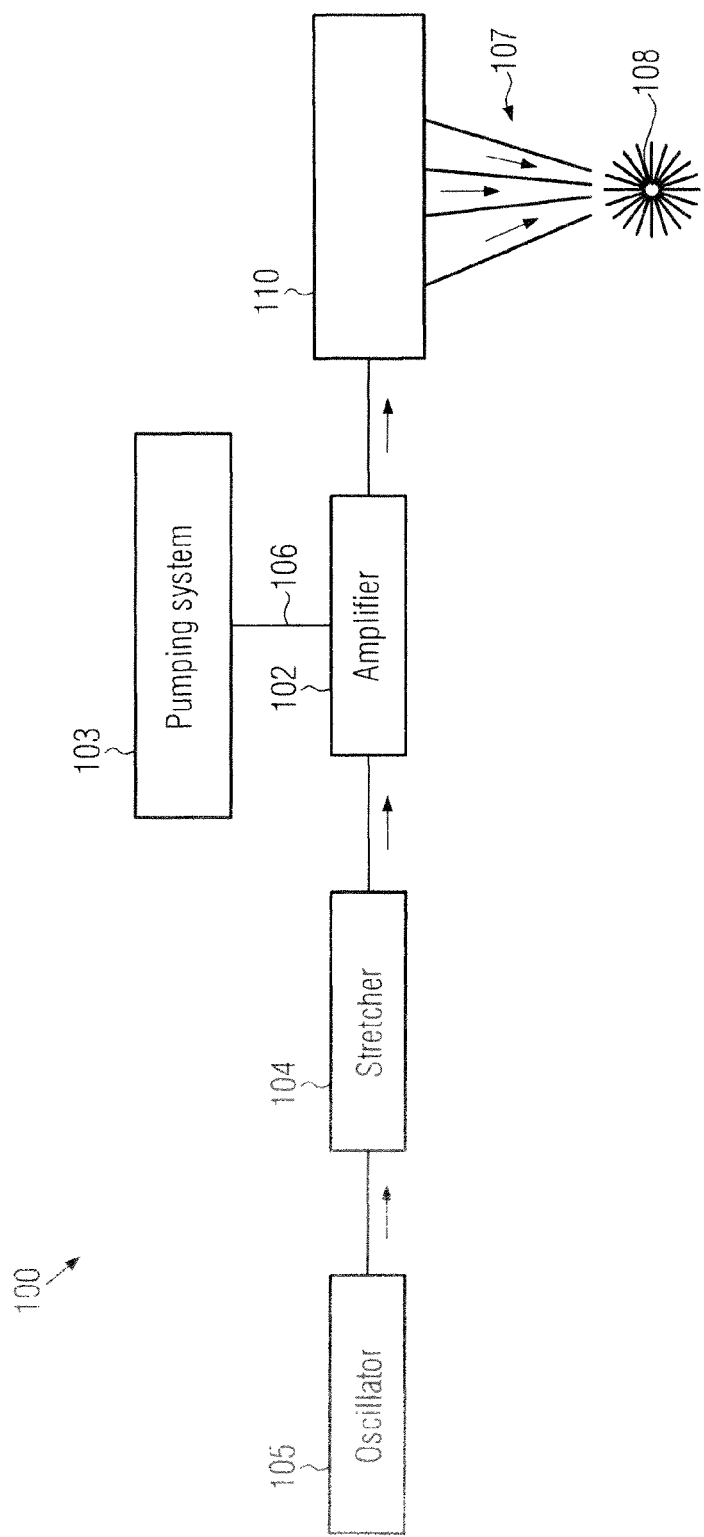
FIG. 1 schematic depiction of a chirped pulse application system.

FIG. 1, depicts a chirped pulse generator 100 according to the disclosure comprising an oscillator 105 that generates a pulse. The oscillator may be e.g. e Ti:Sa Laser outputting femtosecond pulses. The pulses are output at a preferably high repetition rate of $10^7$-$10^9$ Hz, more preferably about $10^8$-$5 \cdot 10^8$ Hz whereas the pulse energy is preferably in the range of $10^{-8}$-$10^{-10}$ J, more preferably between $10^{-9}$-$5 \cdot 10^{-9}$ J. The duration of the pulse may vary within 20 fs to 1 ps. This pulse is directed to a stretcher 104, which temporarily stretches the pulse (by a factor of $10^3$ to $10^5$) in order to reduce the energy density. The stretched pulse is then directed to an amplifier 102 which, in combination with the pumping system 103 that pumps 106 the amplifier 102, amplifies the stretched pulse. The amplification may be in the range between a factor of $10^4$ to $10^6$. The amplified stretched pulse is then directed to a compressor 110 that compresses the stretched pulse. In order to achieve the required energy density and power, for example for laser induced proton emission on thin foils, the output pulse peak power has to be within the region of 1-100 TW. Depending on the exact amount of required power, the needed amplification, repetition rate and pulse energy can be calculated taking into account the breaking threshold of the components of the device.

The compressor according to the present disclosure will achieve fully temporal alignment of frequency components (chromatic parts) in the resulting pulse 107. On the other hand, the compressor 110 yield spatial alignment of all frequency components at a predetermined point 108 in order to achieve high energy deposition at the predetermined point 108, as will be described below. According to the present disclosure, the compressor 110 (which will be further referred to as the chirped compressor 110) comprises a first and a second manipulation device capable of wavelength dependent manipulating the propagation direction of the chirped pulse. The manipulated chirped pulse is transformed into a pulse, when passing the first and second manipulation device. The pulse will comprise different chromatic parts after passing the first and second manipulation device, wherein these parts being spatially spread. Therefore, a focusing device is used that focuses the spatially spread parts such that they are spatially aligned in the predetermined focus point. It should be noted, that the disclosure provides said compressor 110, whereas the oscillator 105, the stretcher 104, the amplifier 102 as well as the pumping system 103 may be derived from or be identical to commonly known devises from CPA.

In the focus point 108 a target may be provided onto which the amplified compressed and focussed pulse impinges. The optical field between the chirped compressor 110 and the focal region is a focussed optical field (a converging optical field), but different chromatic parts (i.e. light having different wavelengths) are spatially spread. For example in FIG. 1, the higher frequency component of the light pulse may be present only on the right side, while the lower frequency component of the pulse may only be present at the left side of the optical field. In the focal region 108 the different chromatic parts of the pulse overlap, interfere constructively which each other and are capable of generating high power pulses with a duration of less than for example 50 fs.

Figure 2A:
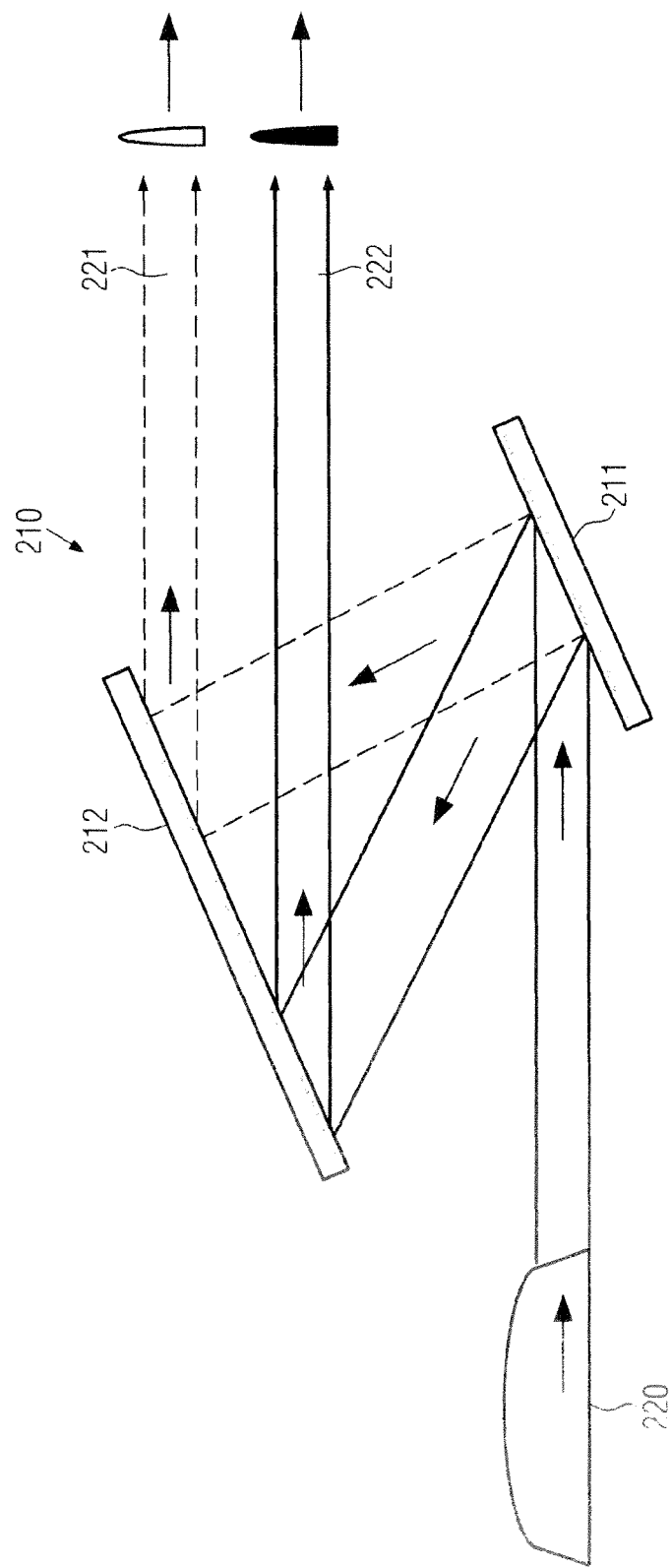
FIG. 2a-b schematic depiction of a chirped pulse compressor in accordance with the disclosure.

FIG. 2a provides a more detailed view on the chirped pulse compressor 210. As can be seen, the chirped pulse compressor 210 comprises a first manipulation device 211 and a second manipulation 212 which are depicted as optic gratings. As will be described below, other realizations of the first and second manipulation device are possible (e.g. prisms).

With reference to FIG. 2a, it should be noted that in any case, the first and second manipulation devices 211 and 212, will influence an incoming chirped pulse 220 due to diffraction such that the incoming chirped pulse 220 is transformed into a pulse that is aggregated by spatial disjoint or spread chromatic parts 221 and 222 (the chromatic parts are also called frequency components). It should be noted that the depicted classification in two frequency components, 221 and 222 is only a simplification. Indeed, each frequency component included in the chirped pulse 220 will be guided through the first and second manipulation device 211 and 212 and will then propagate along a path which is spatially disjoint to the path another frequency component of the chirped pulse 220 will take. Furthermore, it should be noted that the first and second manipulation device 211 and 212 have such optical properties (e.g. in the case of using gratings the grating constant (or line density), or the refractive index in some other realisations) that different chromatic parts 221 and 222 will propagate parallel to each other when leaving the chirped pulse compressor 210 in case no further focusing devices are used before or after the first and second manipulation devices 211 and 212. The different chromatic parts are temporarily fully aligned and travel on a plane that is perpendicular to the direction of propagation.

Figure 2B:
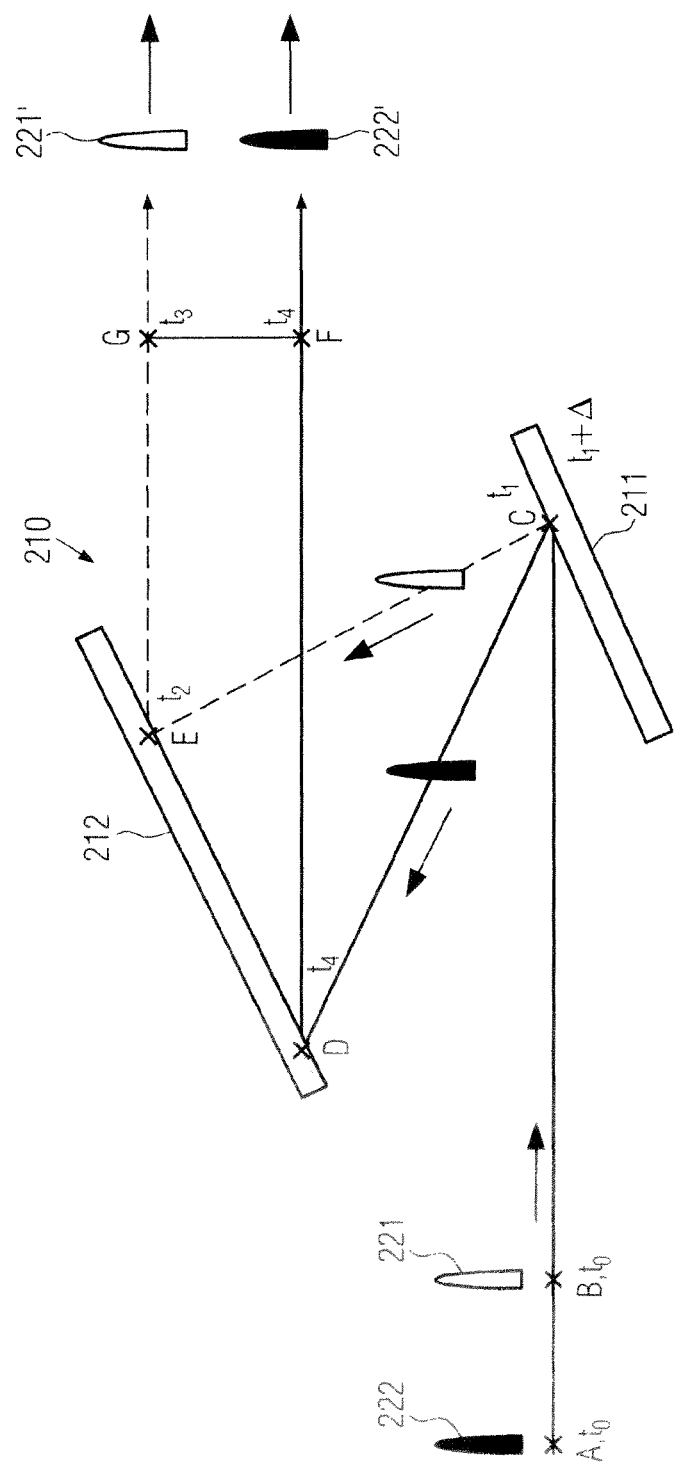

In order to provide a more detailed explanation of the above, reference is made to FIG. 2b. Here, two frequency components (also called chromatic parts), 221 and 222, are considered. These components originate from the chirped pulse 220 depicted in FIG. 2a. The frequency component 221 therefore corresponds to another frequency as the frequency component 222. As can be seen in FIG. 2b, these components are spatially disjoint having a spatial and temporal distance to each other along their propagation direction. Starting with frequency component 221 at position B and time $t_o$ the frequency component 221 will propagate along the path indicated by the arrow and incident on the first manipulation device 211 at the incident point C. Frequency component 221 incidents on this point C at time $t_1$. Due to the wavelength dependent manipulation of the propagation direction of the frequency component 221 that is achieved by the first manipulation device 211, frequency component 221 will propagate along the dashed line and incident on the second manipulation device at point E at time $t_2$. Again, due to the wavelength dependent manipulation of the propagation direction, the frequency component 221 will propagate along the dashed line such that it passes point G at time $t_3$.

Another frequency component 222, corresponding to a frequency different from that of the first component 221, starts at the same time $t_0$ at point A instead of B due to the above described temporal stretching of the chirped pulse. It reaches point C at the time $t_1+\Delta$, wherein $\Delta$ is the time that is necessary to allow the second frequency component 222 to pass the distance between points A and B. Due to its different frequency, the component 222 arrives at the second manipulation device 212 at point D at time $t_4$ after passing the first manipulation device 211. By experiencing a manipulation of the propagation direction different from that of the first component 221, the second component 222 reaches point F at time $t_5$ after passing the second manipulation device 212. Hence, in order to achieve full temporal alignment of the frequency components 221' and 222', leaving the chirped pulse compressor 210, the time difference that occurs from the different incident times of the first frequency component 221 and the second frequency component 222 at point C due to their different starting points A and B have to be compensated. Therefore, the first manipulation device 211 and the second manipulation device 212 are arranged and designed such that the propagation time for the first frequency component 221 from point C over point E to point G is equal to the propagation time of the second frequency component 222 from point C over point D to point F plus the initial time difference $\Delta$. This and the parallel alignment of the spatially spread components 221' and 222' can be achieved by arranging the first and second manipulation device 211 and 212 under specific angles and provide a specific wavelength dependent diffraction behaviour or refraction behaviour (e.g. the grating constant or the refractive index). The parallel spatially spread frequency components 221' and 222' are thus temporarily aligned and therefore will incident on a given surface perpendicular to the propagation direction at the same time, i.e. they will pass points F and G respectively at the same time. This can be used in order to achieve spatial alignment of the frequency component 221' and 222' by using a variety of focusing devices that can be placed either before the chirped pulse passes the first and second manipulation devices 211 or 212, or after the pulse leaves the same, the focusing devices focussing the components 221 and 222 on a predetermined point and being non-chromatic, i.e. yielding focus of components independent of their wavelength.

It should be noted, that in contrast to the known CPA, where the propagation direction, i.e. the unitary propagation vectors $\vec{s}$, of the resulting pulse is independent of the frequency due to the already achieved spatial alignment, the vectors $\vec{s}$ of the present disclosure still depends on the frequency of the respective frequency component. This means, that for the present disclosure, the electric field component corresponds to $\vec{E}=\vec{E}_0 \exp(ik(\omega)\vec{s}(\omega)\cdot\vec{r}-i\omega t)$ with $\omega$ being the frequency of any frequency component (like 221' or 222') and $k(\omega)$ being the frequency dependent wavenumber. Hence, the resulting pulse leaving the second manipulation device does not correspond to a conventional laser beam, which would be represented by a wavelength independent propagation direction. Instead, it is a set of waves each moving in a given propagation direction $\vec{s}(\omega)$. Therefore the temporarily fully aligned components propagate along different directions at a given time, but since they are temporarily fully aligned, non-chromatic devices like mirrors or lenses can be used in order to achieve the spatial alignment in at least one predetermined focus point.

In contrast to conventional CPA pulse compression wherein four gratings are used or wherein two gratings are passed each of them twice due to a mirror, here the different chromatic parts are temporarily fully aligned already after passing only two gratings. In the conventional CPA compression after having passed only two gratings temporal compensation is done only half. The second half of the temporal alignment is done by the third and fourth pass of a grating. Fully temporal compensation in conventional CPA is only achieved after having passed a grating four times. In conventional CPA after having passed a grating four times also spatial alignment is achieved.

FIG. 3a-d depict some realisations of the first and second manipulation device and a focusing device. It should be noted that the depicted realisations can be combined or be used interchangeably or in addition to each other in order to achieve the intended result.

Figure 3A:
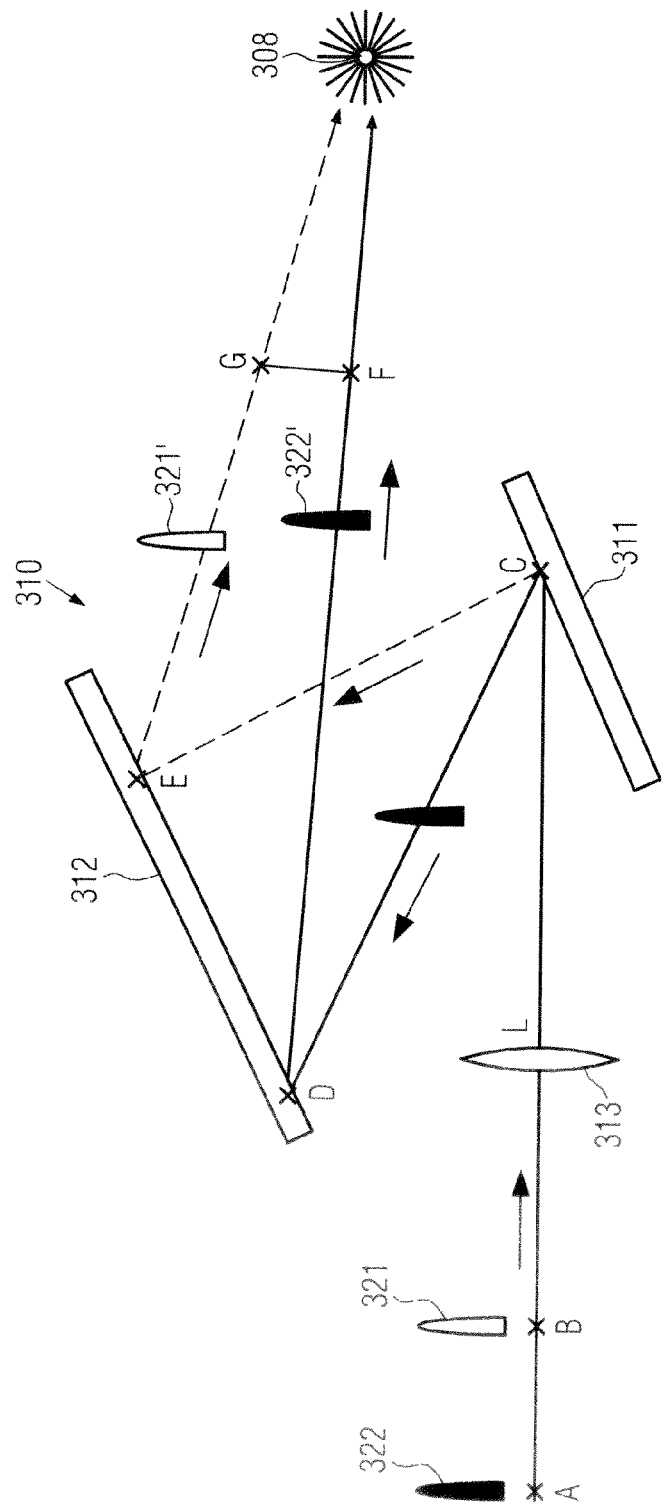

FIG. 3a depicts a first and second manipulation device 311 and 312 as described in FIG. 2 being gratings and a lens 313 is arranged in propagation direction of the chirped pulse or, as representations thereof, the frequency components 321 and 322 before the gratings. The gratings have gratings constants of typically some thousands of lines per millimeter. The grating constant that has to be used and hence the kind of gratings strongly depends on the frequency range of the incident chirped pulse. The lens 313 has its focal point at point 308. Due to the diffraction of the frequency components 321 and 322 when passing the first and second manipulation device the different chromatic parts are converging towards the focus point 308 and are spatially spread but temporarily fully aligned. This results in each and every frequency being focused on the point 308, thereby depositing as much energy as possible within a preferably short time.

FIG. 3b depicts a corresponding arrangement wherein the lens 330 is placed in propagation direction oft the first and second frequency component 321 and 322 after the first and second manipulation device 311 and 312. As explained above, the first and second manipulation device 311 and 312 are capable of transforming the incoming chirped pulse 320 into temporarily fully aligned but spatially spread parallel frequency components 321' and 322'. The same result as described in FIG. 3a is achieved i.e. after the various frequency components 321' and 322' pass the lens 330 they are focused on to the point 308 which they reach at the same time.

Figure 3C:
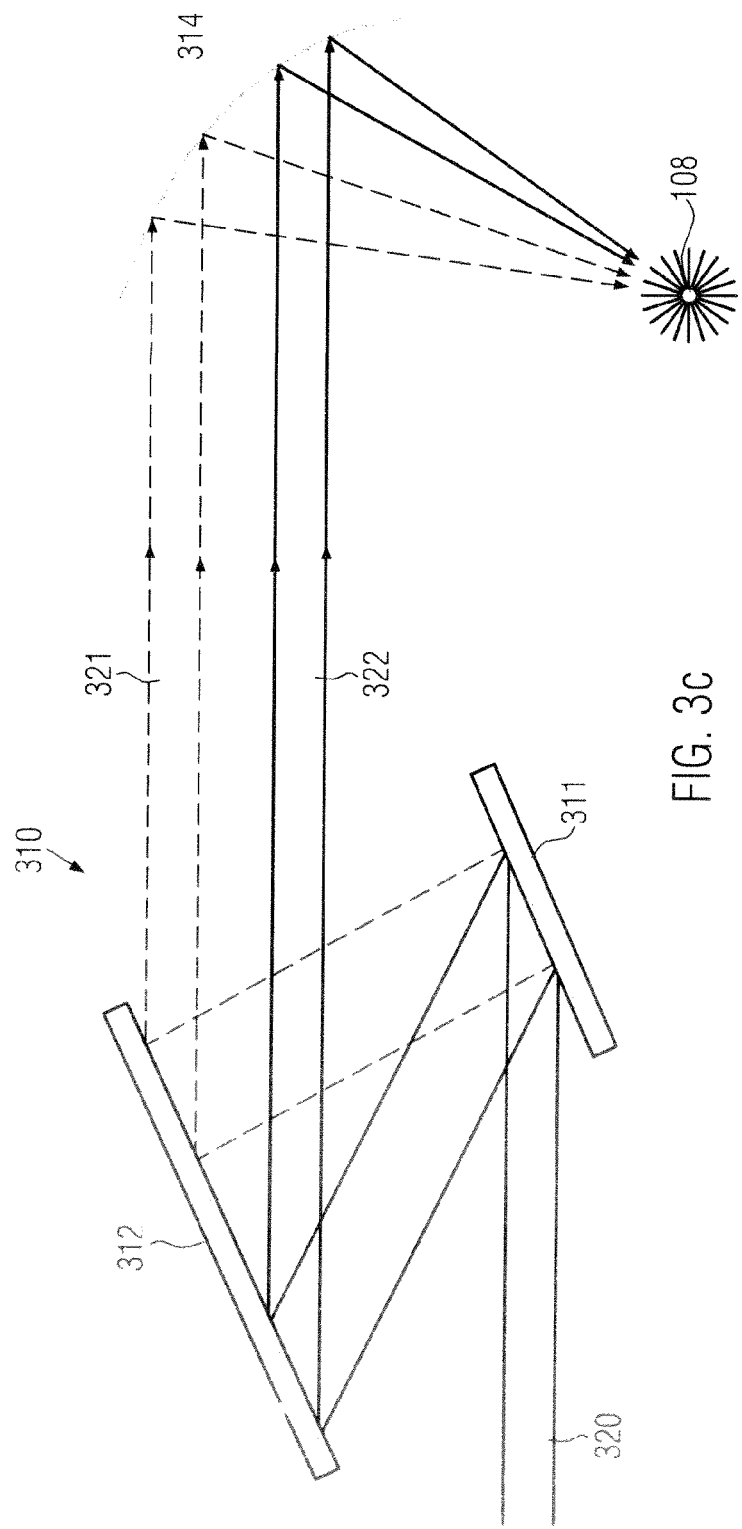

FIG. 3c depicts a corresponding arrangement wherein a parabolic mirror 314 is used to focus the different frequency components 321' and 322'. Like the lens, the parabolic mirror 314 will redirect the temporarily fully aligned but parallel spatially spread frequency components 321' and 322' such that both incident on the focus point 308 at the same time as the temporarily aligned frequency component 321' and 322' propagate on optical paths having the same length when passing the parabolic mirror 314.

Figure 3D:
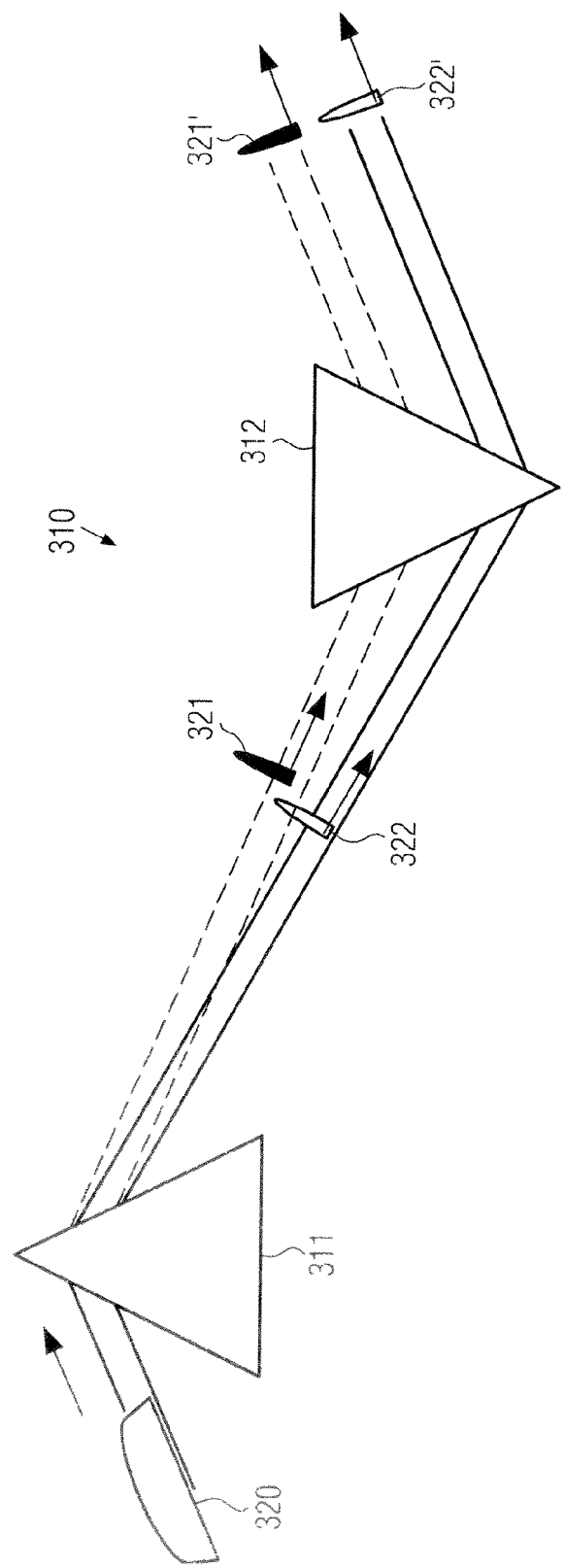

FIG. 3d depicts an alternative realization of the first and second manipulation devices 311 and 312. Here, the first and second manipulation devices 311 and 312 are made of prisms having a predefined refractive index and are arranged under predetermined angles such that an incident chirped pulse 320 that incites on a boundary surface of the first prism 311 and is therefore refracted on the first boundary surface and the second boundary surface of this first prism 311. Thereby, it is fragmented into various frequency components, for example a first frequency component 321 and a second frequency component 322 propagating along different optical paths. Therefore, these components reach the second prism 312 on different points of the boundary surface under different angles at different times. Due to the refractive index of the second prism 312 and its geometrical dimensions, the frequency components 321' and 322' will pass the second prism 312 as temporarily aligned but spatially spread preferably parallel chromatic parts. A focusing device (like a lens or a mirror) can then be applied in order to focus the different chromatic parts onto a predetermined focus point.

It should be noted that the disclosed realizations of the chirped pulse compressor can be combined i.e. it is possible to provide a lens in front of the first and second manipulation device or after the first and second manipulation device and to further provide a parabolic mirror or something similar in order to achieve necessary corrections of the optical paths of the different chromatic parts of the pulse since, under real conditions the first and second manipulation devices will not achieve the explained result up to any desired accuracy.

It might be advantageous not to use two gratings or two prisms but one grating and one prism in order to realize the first and second manipulation device 311 and 312. Considering this, there are three degrees of freedom for realising the first and second manipulation device 311 and 312, such that the intended result is achieved by their relation to one another and their specific characteristics in case gratings are used. The first and second degree of freedom is the grating constant of each grating. The third degree of freedom is the angle under which these gratings are aligned to one another. Hence the angle under which two gratings having the same grating constant have to be aligned to achieve the above described result will be different from the angle under which two gratings having different grating constants have to be aligned. The same holds for utilization of two prisms or one prism and one grating. In the case of two prisms, the refractive index and the boundary surface angle represent the corresponding degrees of freedom. Therefore, further degrees of freedom are available in case of using two prisms 311 and 312 in accordance with FIG. 3d. The first degree of freedom is their alignment to one another, the second and third are their respective refractive indices and the fourth and fifth is the angle which is enclosed by the refractive boundary surfaces of each prism.

It should be noted that the above described arrangements allow for focusing the different chromatic parts of the pulse that originated from a chirped pulse at a predetermined focus point by first achieving temporal alignment of the different chromatic parts. This allows for achieving the spatial alignment by only using wavelength independent devices like lenses or mirrors.

The target may be adapted for the generation of protons upon the pulse impinging the target. The target may be a thin foil e.g. a thin metal foil such that the pulse causes the emission of accelerated protons which can be used for medical purposes such as generation of radiopharmaceuticals. In the focal region power densities between $10^{14}$ and $10^{16}$ or up to $10^{18}$ W/cm$^2$ or even higher power densities are possible.

One specific example of the above described embodiments is a set of two diffractive gratings that are parallel to each other, placed at a distance of 6 to 10 cm from each other, preferably 8 to 9 cm from each other, especially 8.6 cm from each other. This distance relates to the perpendicular distance between parallel gratings. The two gratings have 1000 to 2000 lines/mm, preferably between 1300 and 1800 lines/mm, especially 1740 lines/mm and are sufficiently large such that a diffracted pulse can be covered by each grating. Therefore, the required size of the gratings depends on the diameter of the incident pulse and may vary from one realization to another. A laser pulse, having a wavelength between 600 and 1000 nm, preferably between 700 and 900 nm, especially 800 nm and a Fourier limit bandwidth between 20 and 40 fs, preferably between 25 and 35 fs, especially 30 fs can be used. This laser pulse is stretched to about 20 to 60 ps, preferably 30 to 50 ps, especially 41 ps and then hits the first of the two gratings under a predefined angle, preferably between 30 and 70 degrees, most preferably between 50 and 60 degrees, especially 53 degrees, with respect to the normal to the plane of the first grating. Under a similar angle, the second grating forms a set of parallel rays emerging from said second grating, wherein all of them move in parallel to each other but spread in space, i.e. at a distance from one another. A preferred compression mechanism in this case advantageously induces a delay dispersion of 400000 to 500000 fs$^2$, more preferably between 430000 and 460000 fs$^2$, especially 452030 fs$^2$.

The invention claimed is:

1. An optical pulse generator, comprising
   a source to deliver a chirped pulse and a compressor for compressing the chirped pulse, the compressor comprising a first manipulation device and a second manipulation device capable of wavelength dependent manipulating the propagation direction of the chirped pulse and a focusing device having a predetermined focus point, the focusing device comprising a lens;
   the source comprising a laser oscillator, a pulse stretcher, and an amplifying stage;
   the second manipulation device being arranged after the first manipulation device in propagation direction of the chirped pulse, wherein the first manipulation device and the second manipulation device are gratings;

the first and the second manipulation device being capable of manipulating the propagation direction of the chirped pulse such that the chirped pulse is transformed, after passing the second manipulation device, into a pulse, and different chromatic parts of the pulse are spatially spread and temporarily fully aligned; and wherein the lens is arranged in the propagation direction of the chirped pulse before the gratings and the focal point of the lens is in the propagation direction of the chirped pulse after the gratings.

2. The optical pulse generator according to claim 1, and the first and the second manipulation device are identical gratings and a mirror is provided, the mirror being arranged after the gratings in propagation direction of the chirped pulse.

3. The optical pulse generator according to claim 1, and the first and the second manipulation device are two different gratings.

4. The optical pulse generator according to claim 1, and the focusing device comprises at least a mirror.

5. The optical pulse generator according to claim 1, and the optical pulse generator focuses the spatially spread parts of the chirped pulse on a predetermined line, the line being substantially perpendicular to an averaged propagation direction of the different chromatic parts.

6. The method for generating a pulse by using an optical pulse generator having a source to deliver a chirped pulse and a compressor for compressing the chirped pulse and having a first manipulation device and a second manipulation device capable of wavelength dependent manipulating the propagation direction of the chirped pulse and a focusing device having a lens having a predetermined focus point, the source comprising a laser oscillator, a pulse stretcher, and an amplifying stage, the method comprising:

passing the chirped pulse past the lens after leaving the amplifying stage, the lens having its focus point in propagation direction of the chirped pulse after the first manipulation device and after the second manipulation device; and wherein the chirped pulse, after passing the lens, passes the first manipulation device before passing the second manipulation device;

manipulating the propagation direction of the chirped pulse, by the first and second manipulation device, such that the chirped pulse is transformed, after passing the second manipulation device, into a pulse, and different chromatic parts of the pulse are spatially spread and temporarily fully aligned.

7. The method according to claim 6, and the compressed and focused pulse has a duration of less than 1 ns.

8. The method according to claim 6, and the chirped pulse passes, in propagation direction, two identical gratings and a mirror.

9. The method according to claim 6, and the chirped pulse passes, in propagation direction, the lens and two different gratings.

10. The method according to claim 6, and the chirped pulse passes, in propagation direction, two prisms.

11. The method according to claim 6, and the chirped pulse passes one prism.

12. The method according to claim 6, and the different chromatic parts are focused on a predetermined line, the predetermined line being substantially perpendicular to an averaged propagation direction of the different chromatic parts.

13. The method according to claim 7, and the duration is less than 1 ps.

14. The method according to claim 7, and the duration is less than 50 fs.

* * * * *